(12) United States Patent
Theobald

(10) Patent No.: US 9,463,927 B1
(45) Date of Patent: Oct. 11, 2016

(54) TRANSPORTING AND/OR SORTING ITEMS WITH MOBILE ROBOT(S)

(71) Applicant: Vecna Technologies, Inc., Cambridge, MA (US)

(72) Inventor: Daniel Theobald, Sommerville, MA (US)

( * ) Notice: Subject to any disclaimer, the term of this patent is extended or adjusted under 35 U.S.C. 154(b) by 0 days.

(21) Appl. No.: 14/033,562

(22) Filed: Sep. 23, 2013

(51) Int. Cl.
*G06F 7/00* (2006.01)
*B65G 1/137* (2006.01)

(52) U.S. Cl.
CPC .................................. *B65G 1/1373* (2013.01)

(58) Field of Classification Search
USPC .......................................................... 700/218
See application file for complete search history.

(56) References Cited

U.S. PATENT DOCUMENTS

| | | | |
|---|---|---|---|
| 8,639,382 B1* | 1/2014 | Clark | G06Q 10/087 700/214 |
| 2004/0093116 A1* | 5/2004 | Mountz | 700/216 |
| 2006/0111814 A1* | 5/2006 | Hachitani | G05D 1/027 700/258 |
| 2012/0330458 A1* | 12/2012 | Weiss | B66F 9/063 700/216 |
| 2013/0317642 A1* | 11/2013 | Asaria | G06Q 50/28 700/216 |
| 2014/0100998 A1* | 4/2014 | Mountz et al. | 705/28 |
| 2014/0214196 A1* | 7/2014 | Worsley | 700/217 |

* cited by examiner

*Primary Examiner* — Kyle Logan
(74) *Attorney, Agent, or Firm* — Albert J. Brunett

(57) ABSTRACT

Mobile robots and methods involving mobile robots are provided. In one method, one or more items are manually loaded with one or more mobile robots. Operation of the mobile robots is coordinated, by a remote computer system and/or by one or more of the mobile robots, to sort and transport the items. The coordinated operation includes autonomously moving the mobile robots within their operating environment between respective locations.

4 Claims, 12 Drawing Sheets

TRANSPORTING AND/OR SORTING ITEMS WITH MOBILE ROBOT(S)

BACKGROUND OF THE INVENTION

1. Technical Field

The present invention relates generally to robotics and, more particularly, to transporting and/or sorting items with robots.

2. Background Information

An order fulfillment center typically includes a warehouse with a storage area and a packaging area. To fulfill customer orders, items within the storage area are gathered and moved to the packaging area to be packaged and subsequently shipped to customers.

The items may be gathered and moved in various manners. A fulfillment center employee, for example, may pick the items from shelves in the storage area and place the picked items onto a cart. This employee may subsequently move the items to the packaging area by pushing the cart. This manner of gathering and moving items, however, can be physically demanding and time consuming.

In an effort to increase productivity, some large fulfillment centers have implemented sorting systems to robotically gather and move the items. A typical sorting system includes a picking machine and a matrix of conveyors and slides. The picking machine moves within aisle ways between the shelves in the storage area and uses, for example, a robotic arm to grasp an item. The picking machine moves the grasped item back through the aisle ways and places the item onto one of the conveyors or slides. The conveyors and slides subsequently move the item from the storage area to a desired location in the packaging area for further processing.

Such a sorting system, however, typically requires a relatively large amount of startup capital to install extensive infrastructure and space to implement. In addition, when the picking machine or one of the conveyors breaks down, item processing within the fulfillment center may be temporarily suspended or slowed. The sorting system can also pose an injury risk to fulfillment center employees who inadvertently get in the way of the picking machine while performing other tasks within the aisle ways. As a result, the aisle ways within the storage area may be off-limits to fulfillment center employees during sorting system operation.

There is a need in the art for improved methods and devices for transporting and/or sorting items between locations.

SUMMARY OF THE DISCLOSURE

Mobile robots and methods involving mobile robots are provided. In one method, one or more items are manually loaded with one or more mobile robots. Operation of the mobile robots is coordinated, by a remote computer system and/or by one or more of the mobile robots, to sort and transport the items. The coordinated operation includes autonomously moving the mobile robots within their operating environment between respective locations; e.g., item pickup locations and item drop off locations.

BRIEF DESCRIPTION OF THE DRAWINGS

The following detailed description will be better understood when read in conjunction with the appended drawings, in which there is shown one or more embodiments of the present disclosure. It should be understood, however, that the various embodiments of the present disclosure are not limited to the precise arrangements and instrumentalities shown in the drawings.

DETAILED DESCRIPTION

Figure 1:
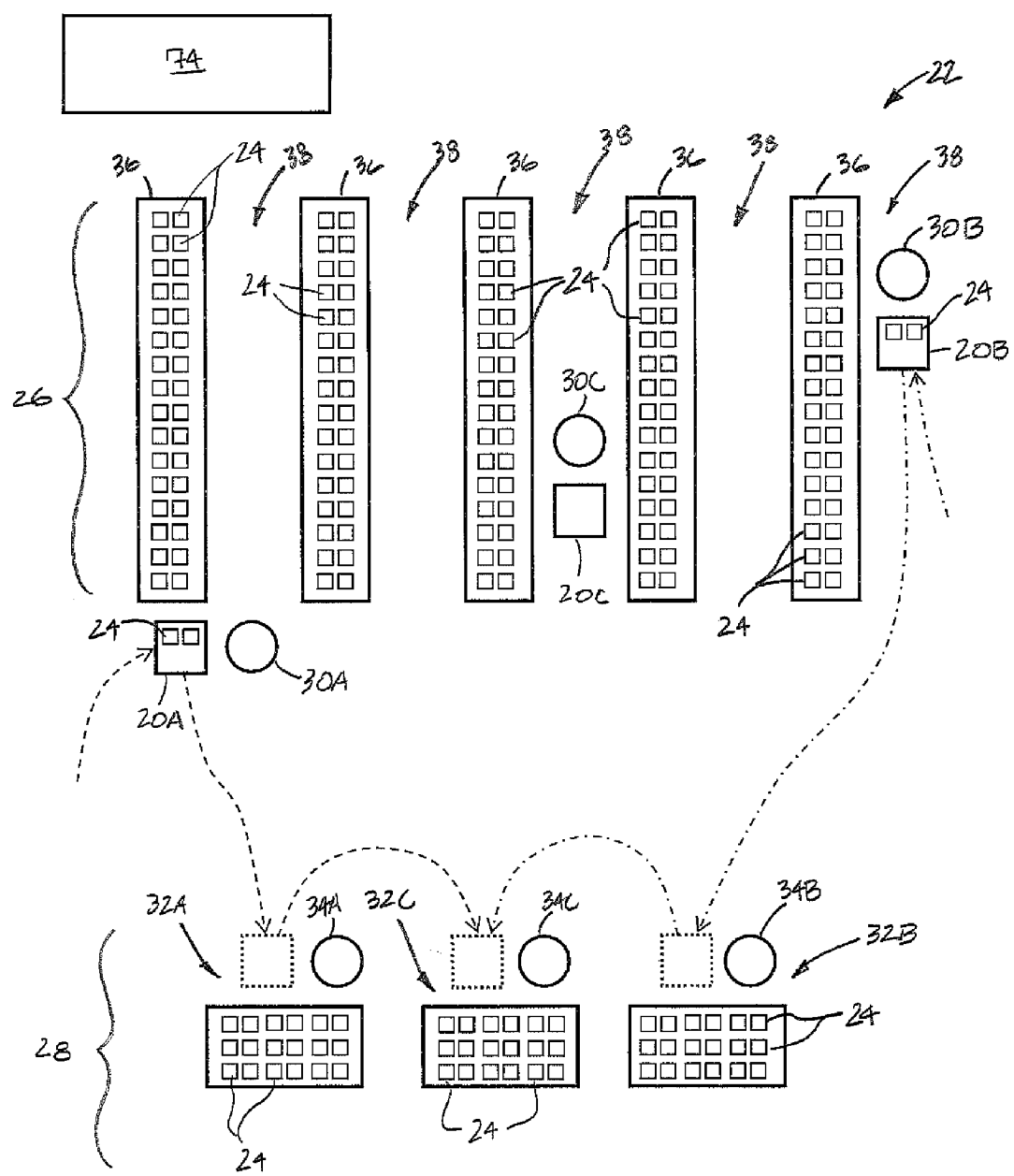
FIG. 1 is a block diagram of a plurality of mobile robots operating within an operating environment.

FIG. 1 illustrates a plurality of mobile robots 20A-C (generally referenced as "20") in an operating environment 22 with an inventory of items 24. One or more of these mobile robots 20 may operate together to provide a virtual item sorting and conveyor system between an item storage area 26 and an item processing area 28. For example, the items 24 may be manually loaded onto the mobile robots 20 at the storage area 26 by one or more individuals 30A-C (generally referenced as "30"). The loaded mobile robots 20 may (i) transport items 24 associated with a first order to a first drop off location 32A in the processing area 28, and (ii) transport items 24 associated with a second order to a second drop off location 32B in the processing area 28. The items 24 may thereafter be manually unloaded from the mobile robots at respective location in the processing area 28 by one or more individuals 34A-C (generally referenced as "34").

This approach represents a unique, novel shift in the design of warehousing and order fulfillment centers. Instead of only having robots 20 and the typical extensive infrastructure in the aisles to pick items 24 and individuals 30 outside of the aisles to receive items 24, both robots 20 and individuals 30 work together in the aisles to accomplish picking items 24 and transporting them for packaging. Thus, the robots 20 can be somewhat less complicated and thus less expensive, among other features, since they do not need to have vision capabilities for locating, picking and accommodating the correct items 24 as well as arms and hands to grip items 24. Here, a plurality of robots 20 are given lists of items 24 to retrieve and move around the aisles to the appropriate location for an item 24 where the robot 20 then signals an individual 30 to pick an item 24 from a rack or the like and place it with the robot 20 as describe in more detail below.

The operating environment 22 may be a warehouse of an order fulfillment center. The term "order fulfillment center"

may describe a business at which items are removed from an inventory and shipped to remote sites to fulfill orders for items placed by consumers, businesses and/or government agencies. The mobile robots 20, of course, may alternatively operate at warehouses and/or storage areas other than those of an order fulfillment center. The mobile robots 20, for example, may operate at warehouse or storage area of a government agency, a hospital, a manufacturer, etc.

The operating environment 22 may include one or more storage units 36. Examples of a storage unit include, but are not limited to, a stack of one or more shelves, a cabinet, a unit of one or more drawers, a table, a bin, etc. Each of these storage units 36 may hold or otherwise support one or more of the items 24 that are stored within the storage area 26. The storage units 36 may also define and/or be arranged adjacent one or more aisle ways 38. Each of the aisle ways 38 may extend between adjacent storage units 36 and/or next to an end storage unit 36.

One or more of the items 24 may be configured as a container or any other type of packaging device that may hold, support and/or otherwise contain one or more gases, liquids and/or solids. Examples of a container include, but are not limited to, a box, a lockbox, a crate, a canister, a bin, a pressure vessel, a tank, a trunk, a suitcase, a vial and a pill bottle. Examples of other types of packaging devices include, but are not limited to, a pallet, a rack, a sack, a bag and a tube.

The container or packaging device may be empty. Alternatively, the container or packaging device may be at least partially filled or loaded with one or more other items; i.e., the contents of the item. These contents may include various types of government, business and/or personal articles (e.g., commodities). Alternatively, one or more of the items 24 may itself be configured as or otherwise include one or more of the government, business and/or personal articles.

Figure 2:
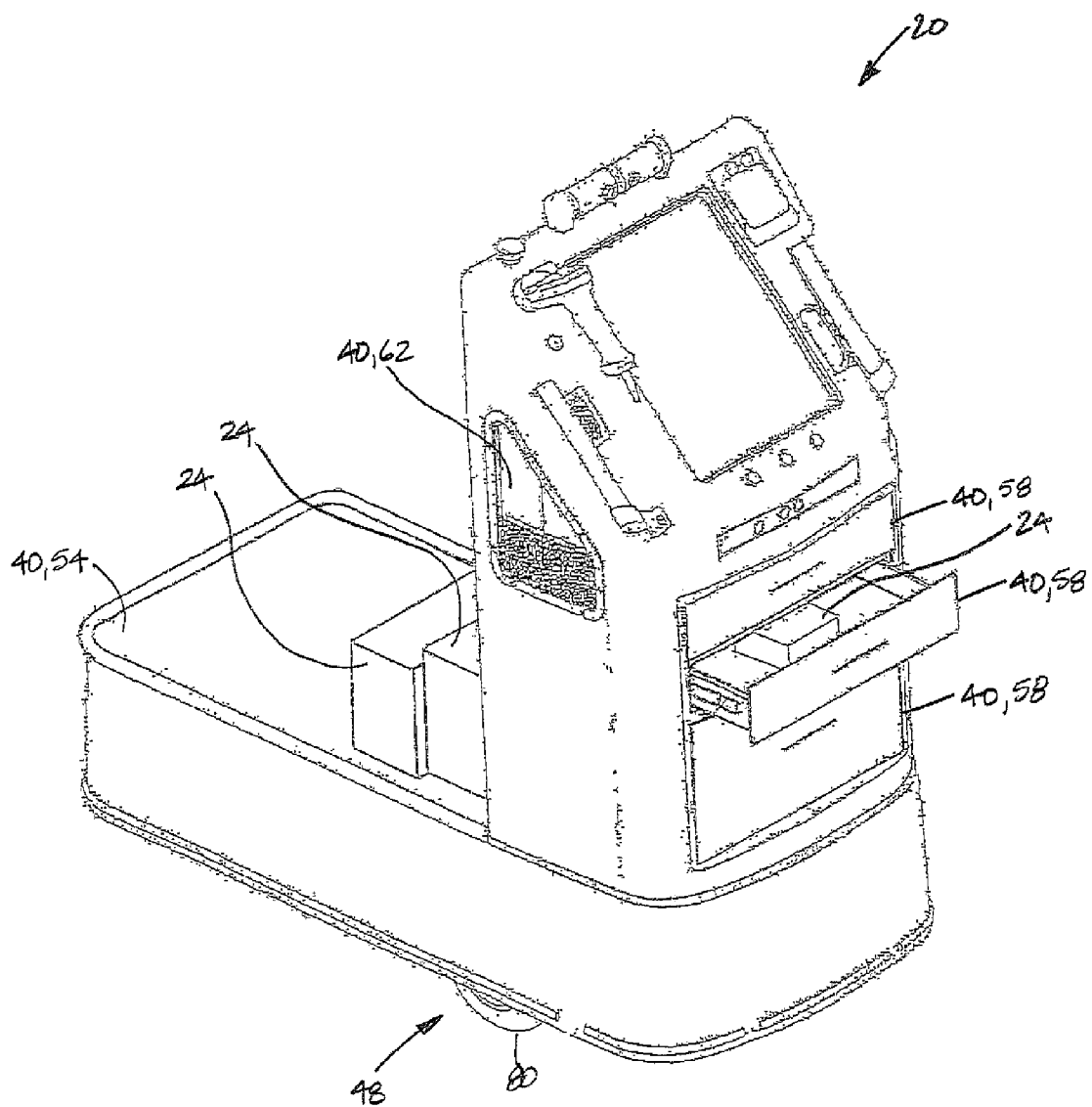
FIG. 2 is a perspective illustration of a mobile robot.

Referring to FIG. 2, one or more of the mobile robots 20 may each be configured as an autonomous mobile robot that performs one or more tasks without continuous outside control and/or intervention. The mobile robot 20, for example, may receive instructions to perform a certain task at a certain location such as, for example, to deliver an item at a drop off location. The mobile robot 20 may subsequently determine and perform the operation(s) necessary to complete the task based on, for example, its current location, surrounding obstacles, its operating environment, the type of task to be performed, etc. The mobile robot 20 may also adapt to unknown, new and/or changing operating environments without additional outside control and/or intervention.

The mobile robot 20 may be fully autonomous during performance of one or more tasks. The mobile robot 20 may be semi-autonomous during performance of one or more tasks. The mobile robot 20 may also or alternatively be (e.g., remote) controlled by an individual (e.g., a human operator) during performance of one or more tasks.

The term "fully autonomous" may describe an apparatus that performs one or more tasks without, for example, any outside control and/or intervention. A fully autonomous mobile robot, for example, may perform a task without receiving instructions (e.g., vectors, commands, etc.) from a human operator during performance of the task.

The term "semi-autonomous" may describe an apparatus that performs one or more tasks without, for example, continuous outside control. A semi-autonomous mobile robot, for example, may perform a task utilizing one or more periodic instructions from an operator (e.g., a human controller) that bound and/or qualify the performance of the task. The instructions may provide, for example, an updated location of where the task is to be performed, identify an unknown obstacle, control the scope of the task, control when the task should be performed, etc.

Figure 3:
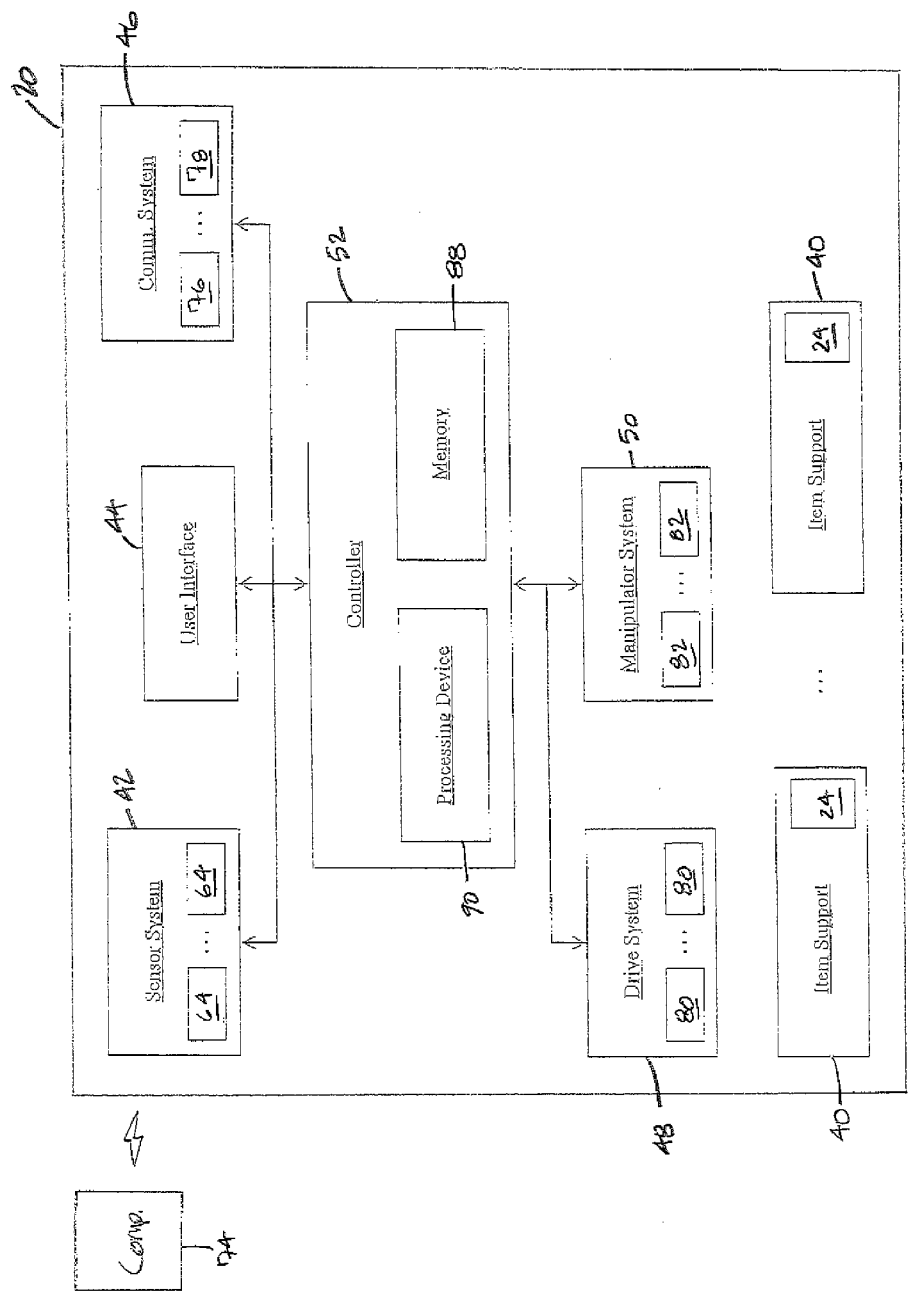
FIG. 3 is a block diagram of components included with a mobile robot.

FIG. 3 is a block diagram of one of the mobile robots 20. This mobile robot 20 includes one or more item supports 40. The mobile robot 20 also includes a sensor system 42, a user interface 44, a communication system 46, a drive system 48, a manipulator system 50 and a controller 52. One or more of these components 42, 44, 46, 48, 50 and 52 may each be a discrete (e.g., self-contained) unit, or configured with one or more of the other components 42, 44, 46, 48, 50 and 52.

Figure 4:
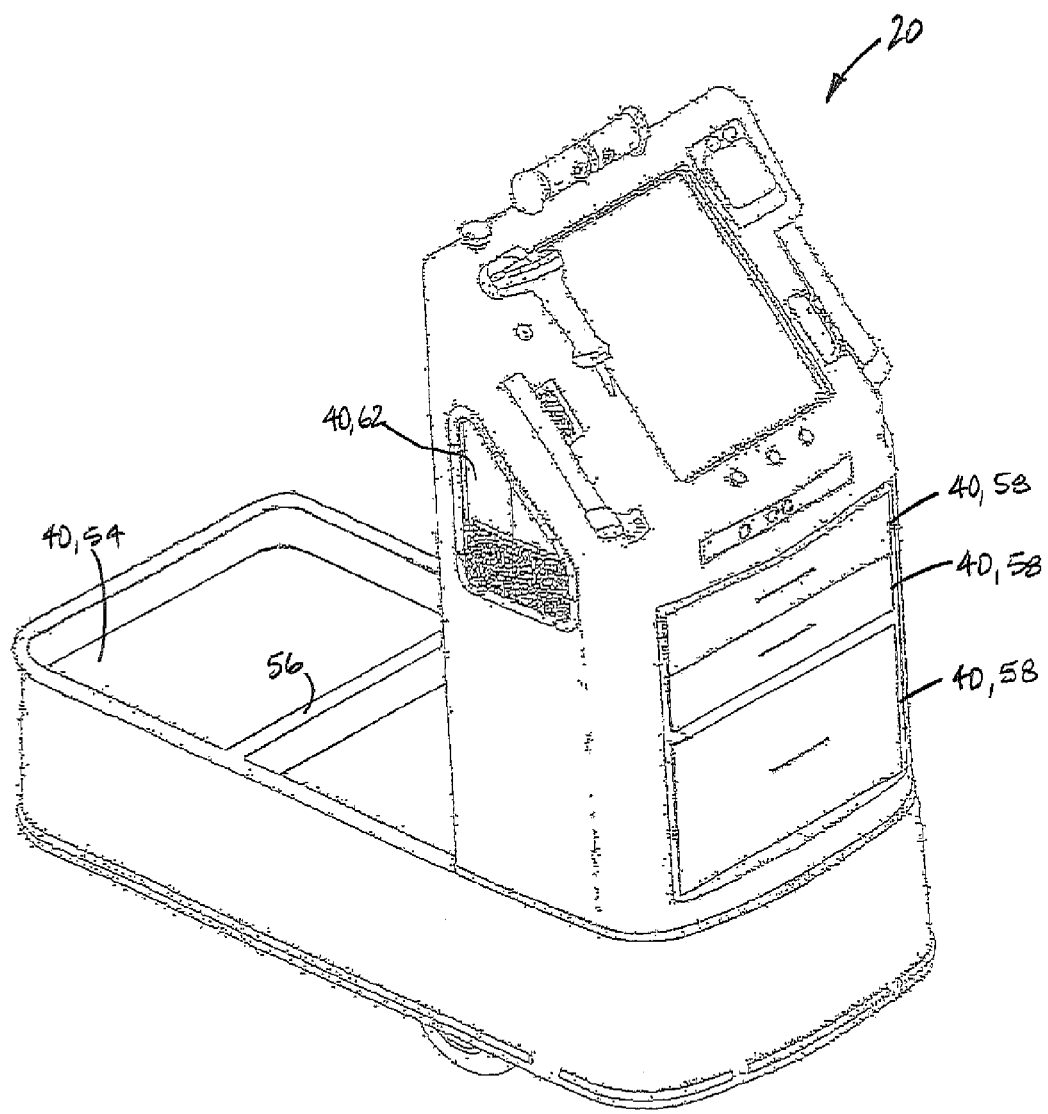
FIG. 4 is a perspective illustration of another mobile robot.
Figure 5:
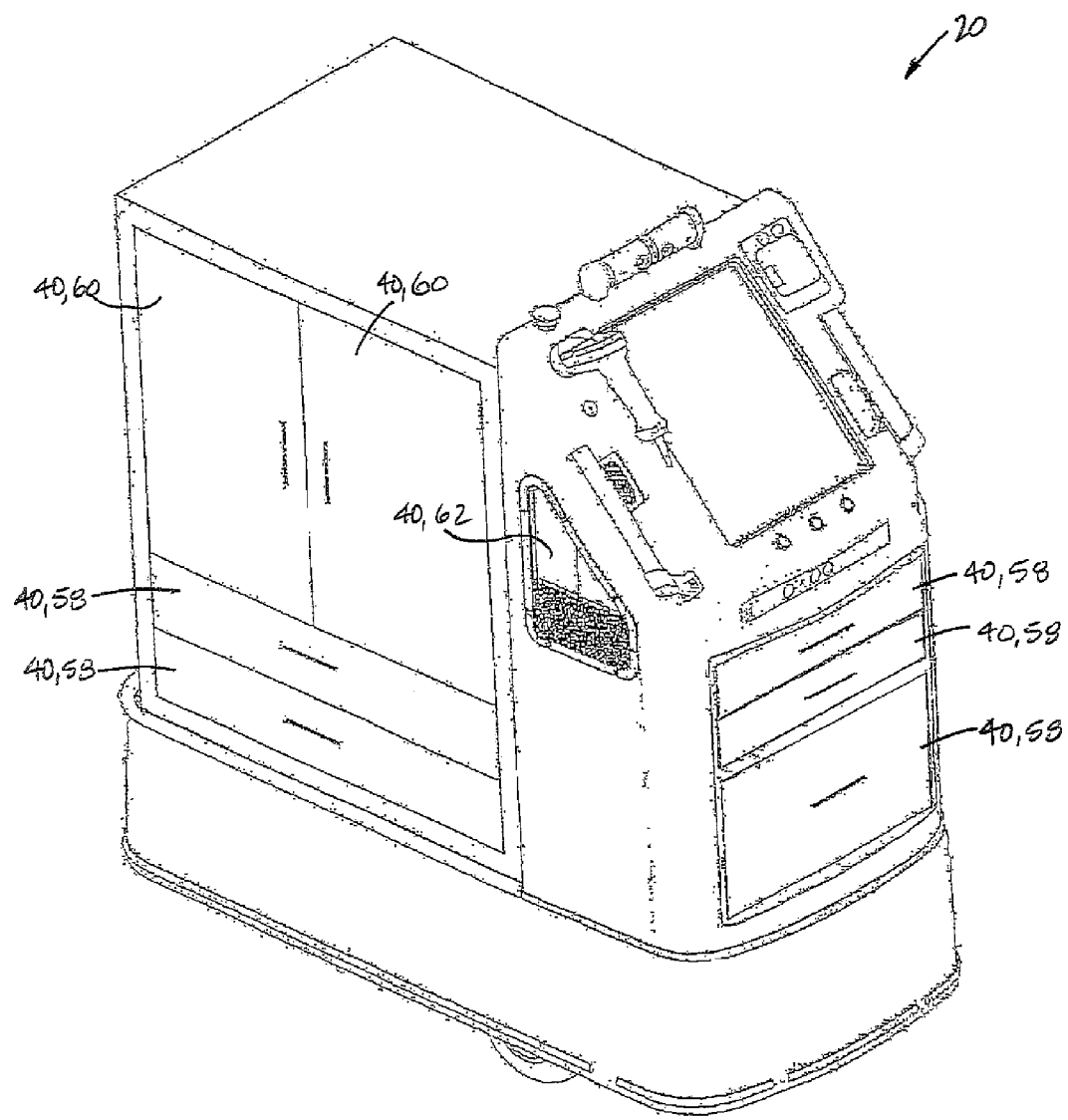
FIG. 5 is a perspective illustration of another mobile robot.

Each of the item supports 40 is adapted to securely or accessibly hold, contain and/or otherwise support one or more of the items 24. For example, referring to FIG. 2, at least one of the item supports 40 may be configured as a platform 54 such as, for example, a deck or a bed. This platform 54 may have a single support surface. Alternatively, referring to FIG. 4, the platform 54 may include at least one divider 56 that defines a plurality of support surfaces. Referring to FIG. 5, one or more of the item supports 40 may each be configured as a drawer 58 (e.g., cabinet drawer). One or more of the item supports 40 may each be configured as a shelf within, or a base of, a cabinet interior (e.g., a cubby), which may be opened and closed using at least one cabinet door 60. At least one of the item supports 40 may be configured as an exterior compartment 62 such as, for example, a cubby or a pocket. The present invention, of course, is not limited to the foregoing item support examples.

The mobile robot 20 may also or alternatively include various item supports 40 other than those described above and illustrated in the drawings. For example, the mobile robot 20 may include an item support configured as or arranged within a climate controlled (e.g., refrigerated) container. In this manner, the mobile robot 20 may transport or otherwise hold (e.g., perishable) items for a relatively long time between receiving and delivering the items. The mobile robot 20 therefore is not limited to any particular item support configurations.

Referring to FIGS. 1 and 3, the sensor system 42 is adapted to survey the operational environment of the mobile robot 20; e.g., room(s) and/or hallway(s) of the facility. The sensor system 42 is also or alternatively adapted to receive location data. This location data is indicative of a location of the mobile robot 20 within the operating environment 22 and/or location(s) of other object(s) within the operating environment 22. Examples of an object include, but are not limited to, another mobile robot, an individual, an animal, a wall, a threshold, a step, a door, a storage unit, or any other type of obstruction or landmark.

Referring to FIG. 3, the sensor system 42 includes one or more locator sensors 64. These locator sensors 64 are adapted to spatially locate (e.g., triangulate) the mobile robot 20 relative to, for example, its surrounding environment, its geographic location, and/or one or more locators (e.g., RF tags, physical landmarks, etc.). Examples of the locator sensor 64 include, but are not limited to, a proximity sensor, a global positioning system (GPS) receiver, a radar system, an infrared system, a laser system, a radio transceiver, and a visual location system with at least one camera. The sensor system 42 may also or alternatively include one or more sensors other than those described above.

Figure 6:
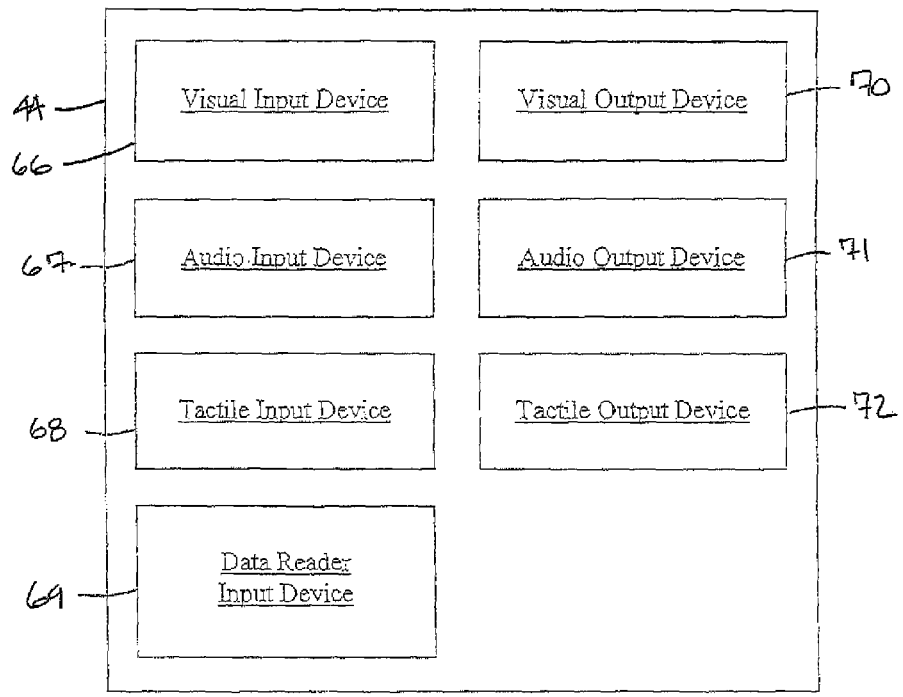
FIG. 6 is a block diagram of components included with a user interface for a mobile robot.

Referring to FIG. 6, the user interface 44 includes one or more information input and/or output (I/O) devices 66-72. The I/O devices 66-69 are adapted to receive information from an individual (or individuals). The I/O devices 70-72 are adapted to electronically present information to an individual (or individuals). The information may be provided to and/or presented by the user interface 44 in a visual form, an audible form and/or a tactile form. The information may also or alternatively be provided to the user interface 44 electronically; e.g., through a data transfer. While various examples of I/O devices 66-72 are described below, the user interface 44 may also or alternatively include I/O device(s) other than those described herein.

The I/O device 66 is configured as a visual input device for receiving visual information from the individual(s). An example of such a visual input device is a camera configured with a gesture recognition system. Examples of a gesture include, but are not limited to, a hand signal and/or an arm signal. Another example of such a visual input device is a bio-information sensor (e.g., scanner) such as, for example, an eye retinal sensor, a fingerprint sensor and a handprint sensor.

The I/O device 67 is configured as an audio input device for receiving audible information from the individual(s). An example of such an audio input device is an electro-acoustic transducer (e.g., a microphone) configured with a voice recognition system.

The I/O device 68 is configured as a tactile input device through which the individual(s) may physically input information. An example of such a tactile input device is an electronic selection device, which may include a track pad, a touch pad, a track ball, a mouse, and/or a joystick. Other examples of a tactile input device include a keyboard and a keypad. Another example of a tactile input device is a touch screen.

The I/O device 69 is configured as a data reader input device for electronically reading or otherwise receiving information from another object or device (e.g., an identification (ID) card). Examples of such a data reader input device include a barcode scanner, a microchip (e.g., security chip) reader and a card reader. Such I/O device may also be used for identifying and/or determining other information related to the items 24.

The I/O device 70 is configured as a visual output device for presenting information to the individual(s) in a visual form. An example of such a visual output device is a display screen such as, for example, a liquid crystal display (LCD) screen, a light emitting diode (LED) display screen, and a plasma display screen. Such a display screen may be configured with one or more sensors to provide a touch screen (e.g., the touch screen). Another example of a visual output device is a printer such as, for example, a laser printer, an inkjet printer, or a thermal printer.

The I/O device 71 is configured as an audio output device for presenting information to the individual(s) in an audible form. An example of such an audio output device is an electro-acoustic transducer such as a loudspeaker.

The I/O device 72 is configured as a tactile output device for presenting information to the individual(s) in a tactile form. Examples of such a tactile output device may include a Braille display and a refreshable Braille terminal. Such devices may also be configured as tactile input devices.

Referring to FIG. 3, the communication system 46 is adapted to receive data from at least one remote computer system 74 and/or another mobile robot 20. Examples of such a remote computer system 74 include, but are not limited to, a kiosk, a personal computer (e.g., a desktop or laptop computer), a tablet computer, a mobile telephone (e.g., a smart phone), a personal digital assistant (PDA), and a central computer system. The communication system 46 is also adapted to send (e.g., transmit) data to at least one remote computer system 74 and/or another mobile robot 20.

The communication system 46 includes a cellular, satellite and/or radio receiver 76. The communication system 46 also includes a cellular, satellite and/or radio transmitter 78. In addition, the communication system 46 may include at least one port for receiving a wired connection to the remote computer system 74 where, for example, the mobile robot 20 is docked at a station.

The drive system 48 is adapted to move the mobile robot 20 within its operating environment 22; e.g., inside of the fulfillment center. The drive system 48 includes one or more drive system components 80. One or more of these components 80 may each be configured as a propulsion device. One or more of the components 80 may also each be configured as a steering device. The drive system 48 of FIG. 2, for example, includes one or more motorized drive wheels and one or more steerable wheels. In another example, the drive system 48 may include one or more motorized (e.g., robotic and multi-linkage) track systems. The drive system 48 may also or alternatively include one or more drive system components with configurations other than those described above and illustrated in the drawings. For example, the steerable wheels of FIG. 2 may also be configured as motorized drive wheels and/or the motorized drive wheels may also be configured as steerable wheels.

Referring to FIG. 3, the manipulator system 50 includes one or more manipulators 82. One or more of these manipulators 82 may be adapted to move, or assist with the movement of, one or more of the items 24 onto or into one or more of the item supports 40. One or more of the manipulators 82 may be adapted to move, or assist with the movement of, one or more of the items 24 off or out of one or more of the item supports 40.

Figure 7:
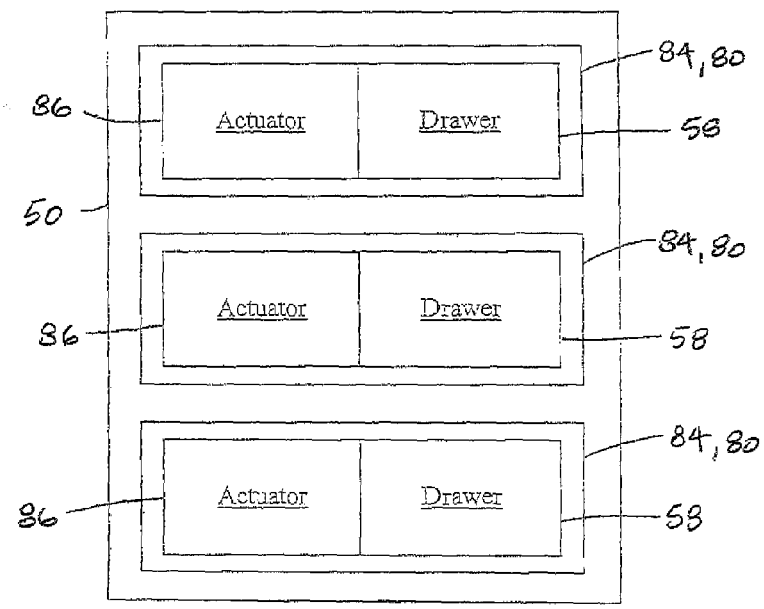
FIG. 7 is a block diagram of components included with a manipulator system of a mobile robot.

Referring to FIG. 7, one or more of the manipulators 82 may each be configured as a robotic drawer 84. Each robotic drawer 84 includes a respective one of the drawers 58 and at least one actuator 86, which is adapted to open and/or close the drawer 58. Examples of an actuator 86 include, but are not limited to, an electric motor, a hydraulic or pneumatic pump, and a hydraulic cylinder. Alternatively, one or more of the drawers 58 may each be configured as a manual drawer. Moreover, in some embodiments, the manipulator system 50 may be omitted from the mobile robot 20 to reduce cost and complexity of the mobile robot 20.

The manipulator system 50, of course, may also or alternatively include one or more manipulators other than those described above and illustrated in the drawings. For example, one or more of the manipulators 82 may each be configured as a pallet jack, a lift platform, a conveyor system, a slide carriage or a crane. In another example, one or more of the manipulators 82 may be configured as a robotic manipulator arm with at least one end effector. Examples of an end effector include, but are not limited to, a gripping device, a suction device, an electromagnet, a winch, a clasp, etc.

Referring to FIG. 3, the controller 52 is in signal communication (e.g., hardwired or wirelessly connected) with the sensor system 42, the user interface 44, the communication system 46, the drive system 48 and the manipulator system 50. The controller 52 is implemented with a combination of hardware and software. The hardware includes memory 88 and a processing device 90 (or system), which includes one or more single-core and/or multi-core processors. The hardware may also or alternatively include analog and/or digital circuitry other than that described above.

The memory 88 may be a non-transitory computer readable medium, and configured to store software (e.g., program instructions) for execution by the processing device 90. The memory 88 may include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 8:
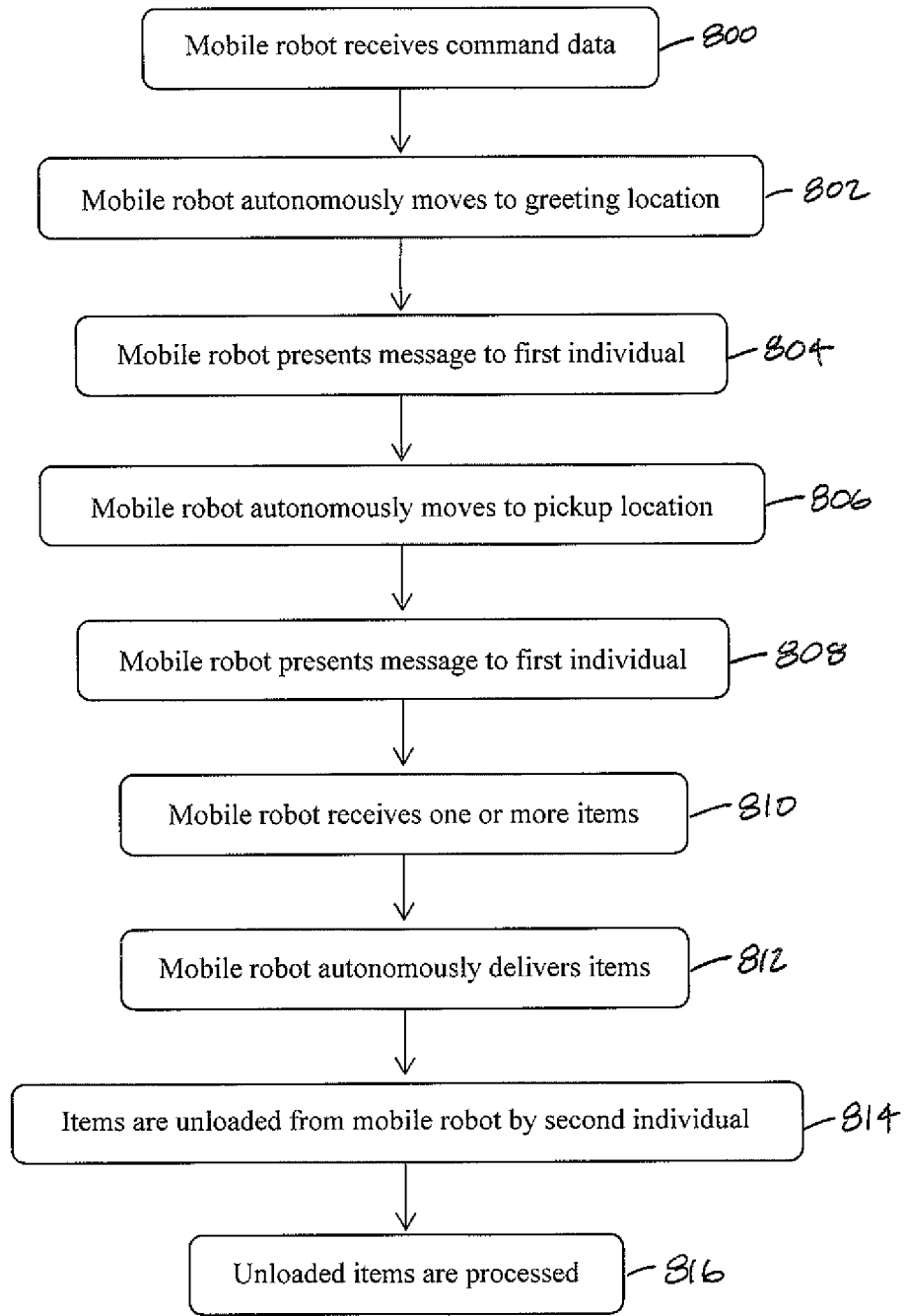
FIG. 8 is a flow diagram of a method involving a mobile robot.
Figure 9:
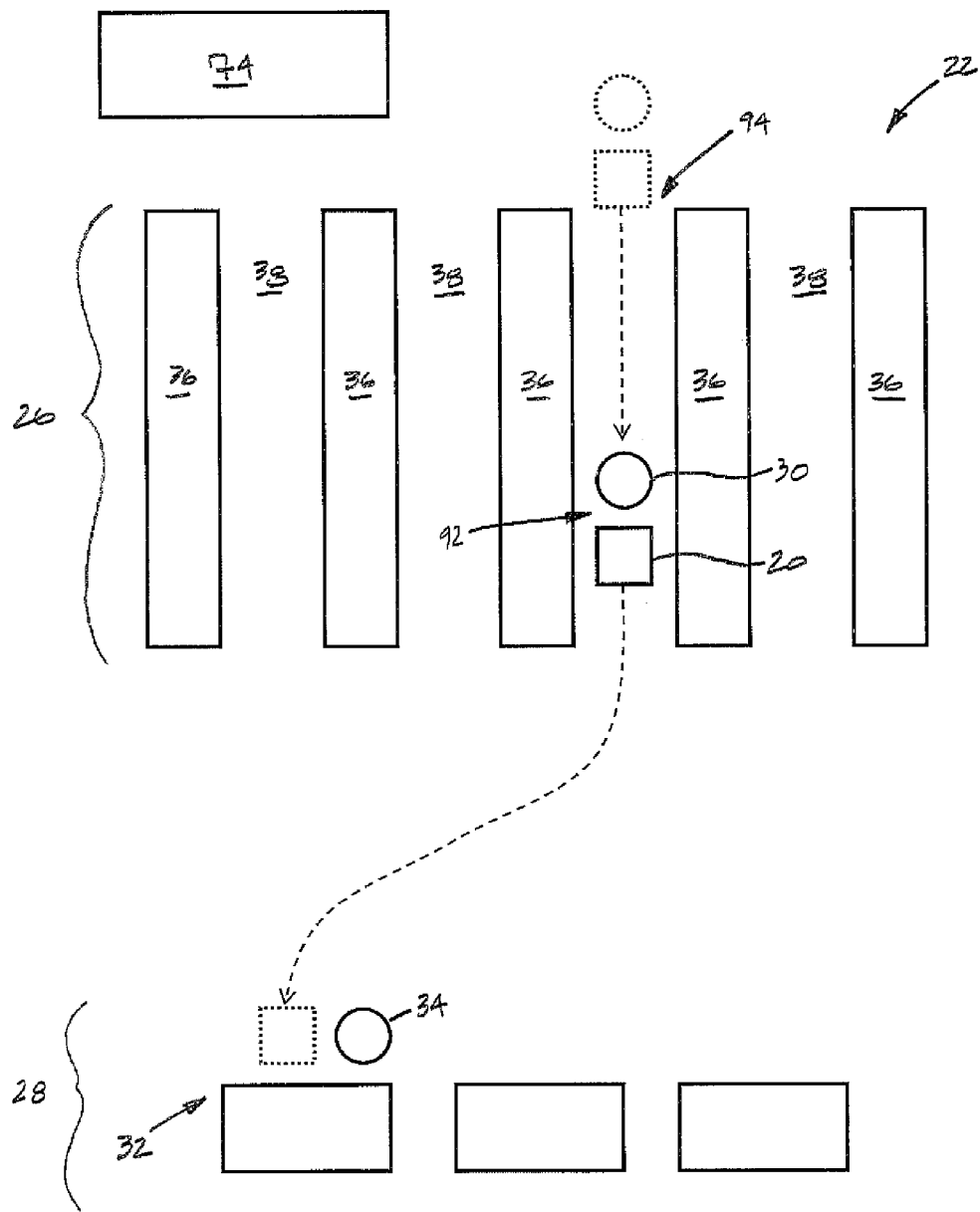
FIG. 9 is a block diagram of a mobile robot operating within the operating environment.

FIG. 8 is a flow diagram of a method involving the mobile robot 20. This method is described below with reference to the mobile robot 20 of FIGS. 2, 3 and 9 for illustrative purposes. The present method, however, may also be performed using a mobile robot 20 with a configuration other than that described above and illustrated in the drawings. In addition, one or more of the following steps may be omitted or replaced with one or more additional steps depending upon the operating environment and the specific task to be performed.

In step 800, the mobile robot 20 receives command data. The communication system 46, for example, may receive the command data from a remote computer system 74, or another mobile robot, that coordinates the operation of the present mobile robot 20 with one or more other mobile robots. Alternatively, the command data may be entered by an individual through the user interface 44.

The command data may include inventory data, location data, scheduling data, etc. The inventory data may identify the contents, types, states (e.g., amorphous or non-amorphous), masses, weights, dimensions, et cetera, of one or more items 24.

The location data may identify one or more item pickup locations 92 and/or greeting locations 94 within the storage area 26. The location data may identify one or more of the drop off locations 32 within the processing area 28. The location data may identify where one or more of the items 24 are stored with the storage units 36. The location data may also or alternatively identify where one or more items 24 should be loaded with the mobile robot 20; e.g., in the drawer 58 or on the platform 54.

The scheduling data may identity at what times and/or time frames the mobile robot 20 is to move to one or more of the pickup locations 92, greeting locations 94 and/or drop off locations 32. The scheduling data may also or alternatively identify at what times and/or time frames the mobile robot 20 is to receive and/or deliver one or more of the items 24.

In step 802, the mobile robot 20 autonomously moves to the greeting location 94 (e.g., at an end of aisle way 38 or aisle) within the storage area 26. The controller 52, for example, may signal the drive system 48 to move the mobile robot 20 to the greeting location 94 at a certain time based respectively on information provided by the location data and the scheduling data. The controller 52 may locate the greeting location 94 and move the mobile robot 20 within the operating environment 22 (e.g., a fulfillment center) while avoiding other objects using the sensor system 42. The sensor system 42, for example, may provide sensor data to the controller 52 indicative of the current coordinates of the mobile robot 20, the coordinates of the greeting location as well as locations and/or headings of other objects within the operating environment 22.

In step 804, the mobile robot 20 presents a message to the individual 30 at the greeting location 94. The controller 52, for example, may signal the user interface 44 to present the message in a visual form using the visual output device 70.

The controller 52, of course, may also or alternatively signal the user interface 44 to present the message in an audible and/or tactile form respectively using the audio output device 71 and/or the tactile output device 72.

The message may include information regarding the one or more items 24 the mobile robot 20 is tasked to pickup. The message, for example, may identify:
which type(s) of item(s) 24 are to be loaded with the mobile robot 20;
a quantity of each type of item 24 to be loaded with the mobile robot 20;
a location of where in the storage area 26 each item is stored;
which of the storage unit(s) 36 the item(s) 24 are stored with; and/or
location(s) of where the item(s) 24 are stored on or in a respective storage unit 36.

The message, of course, may also or alternatively provide information other than that described above.

In step 806, the mobile robot 20 autonomously moves to the pickup location 92 (e.g., within the aisle way) within the storage area 26. The controller 52, for example, may signal the drive system 48 to move the mobile robot 20 to the pickup location 92 in a similar manner as described above with respect to the step 802. The mobile robot 20 may follow the individual 30 from the greeting location 94 to the pickup location 92. Alternatively, the mobile robot 20 may lead the individual 30 from the greeting location 94 to the pickup location 92.

In step 808, the mobile robot 20 presents another message to the individual 30 at the pickup location 92. The controller 52, for example, may signal the user interface 44 to present the message in a visual, audible and/or tactile form in a similar manner as described above with respect to the step 804. The present message may repeat information from the message presented in the step 804. The present message may also or alternatively provide additional information such as identifying:
with which of the item supports 40 each item 24 is to be loaded; and/or
a location on each item support 40 each item 24 is to be loaded.

In this manner, the item(s) 24 to be loaded with the mobile robot 20 may be sorted by item type, by item order, order fulfillment priority, etc. in order to facilitate further processing of the items 24 within the operating environment 22.

In step 810, the mobile robot 20 receives one or more items 24. The individual 30, for example, may manually gather the identified items 24 from the identified storage units 36. The individual 30 may subsequently manually load the items 24 onto or into the identified item supports 40; e.g., on the platform 54 and/or in the drawer 58. One or more of the items 24 may be loaded directly onto or into the item support(s) 40. One or more of the items 24 may also or alternatively be loaded indirectly onto or into the item support(s) 40; e.g., on another item 24. The individual 30 may pick and/or load the one or more of the items 24 by hand. The individual 30 may also or alternatively pick and/or load one or more of the items 24 using another device such as a pallet jack, a dolly, etc.

In step 812, the mobile robot 20 autonomously delivers one or more of the items 24 to the drop off location 32 within the processing area 28. The mobile robot 20, for example, may autonomously move to the drop off location 32 in a similar manner as described with respect to the steps 802 and/or 806. The mobile robot 20 may thereafter present a message to the individual 34 at the drop off location 32 in a similar manner as described with respect to the steps 804 and 808. This message, for example, may identify:
- which of the item(s) 24 to unload from the mobile robot 20;
- which item(s) 24 are associated with which item order(s);
- which of the item support(s) 40 to unload; and/or
- how to further process one or more of the items 24 (e.g., identify an address of where one or more of the items 24 is to be shipped, identify how one or more of the items 24 is to be packaged for shipment, identify a size of the container in which the item 24 should be placed, etc).

The message, of course, may also or alternatively provide information other than that described above.

In step 814, one or more of the items 24 are unloaded from the mobile robot 20. The individual 34, for example, may manually unload the specified items 24 from the specified item support(s) 40. Alternatively, the items 24 may be unloaded from the mobile robot 20 by a manipulator system of another mobile robot or a stationary pick-and-place machine.

In step 816, the items 24 unloaded from the mobile robot 20 are further processed. One or more of the items 24, for example, may be labeled with product information, sender information and/or recipient information. The items 24 may also or alternatively be packed into one or more containers for shipment to a remote site (e.g., the customer's location), or another location at the operating environment 22 site. One or more of the containers may subsequently be labeled with product information, sender information and/or recipient information. One or more of the items 24, of course, may also or alternatively be further processed in various manners other than those described above. Within a manufacturing environment, for example, one or more of the items 24 may be assembled to form another item (e.g., a vehicle) and/or be altered (e.g., painted).

In some embodiments, the mobile robot 20 may visually identify the location of one or more of the items 24 in the storage area 26 and/or the location of the item(s) 24 with the mobile robot 20. The mobile robot 20, for example, may present an image of the item(s) 24 on the support unit 36 using the visual output device 70. Alternatively, the mobile robot 20 may point to the item(s) 24 using a laser pointer or any other visual marking device. The laser pointer may be connected to a 2-axis manipulator (e.g., rotating turret) or a multi-axis manipulator arm, which is included with the manipulator system 50 and controlled by the controller 52.

Figure 10:
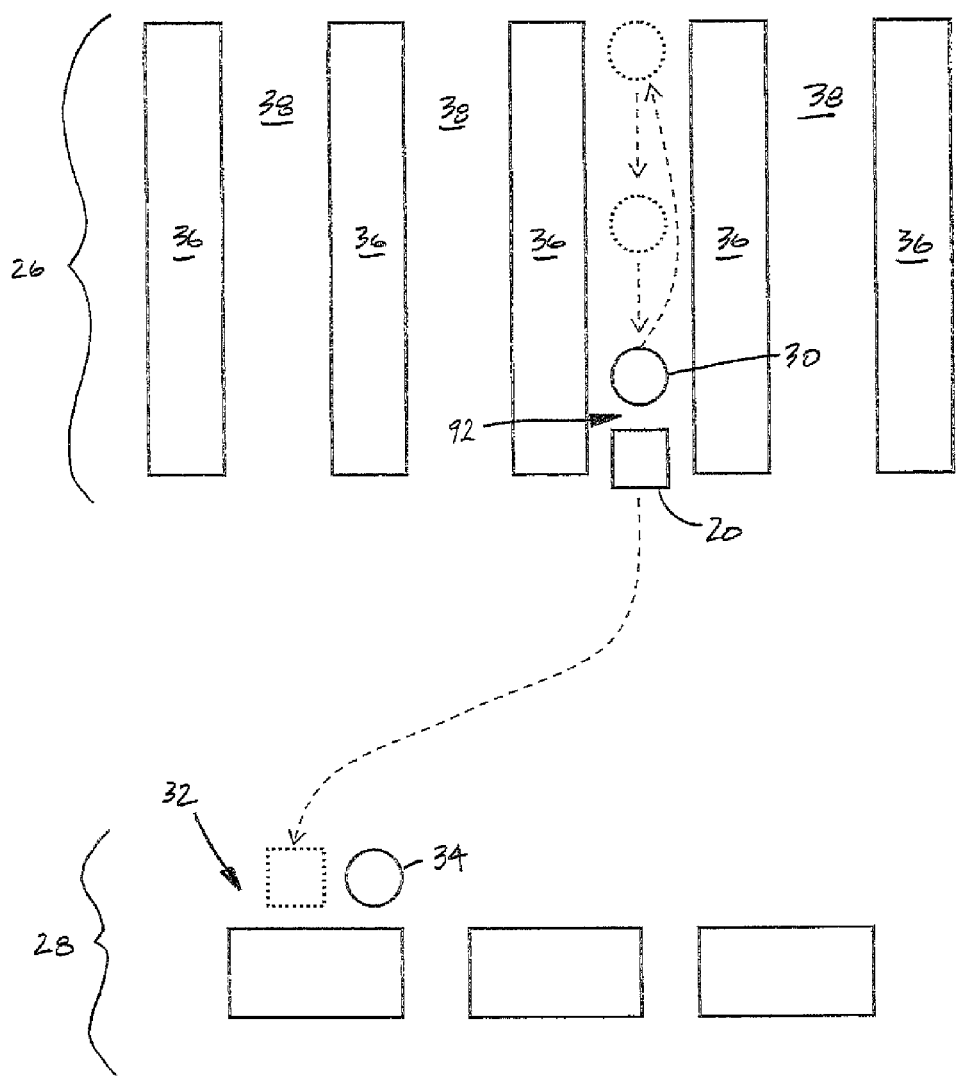
FIG. 10 is another block diagram of a mobile robot operating within the operating environment.

In some embodiments, the mobile robot 20 may directly travel to the pickup location 92 without first meeting the individual 30 at the greeting location 94 as illustrated in FIG. 10. In such embodiments, the individual 30 may gather the item(s) 24 from other locations within the aisle(s) and return to the pickup location 92 to load the mobile robot 20. Alternatively, the individual 30 may load one or more items 24 with the mobile robot 20 at the pickup location 92. The mobile robot 20 may thereafter deliver the items 24 and/or move with the individual 30 to another pickup location to receive one or more additional items 24.

In some embodiments, the items 24 may be loaded with the mobile robot 20 by a plurality of individuals at the same pickup location.

Figure 11:
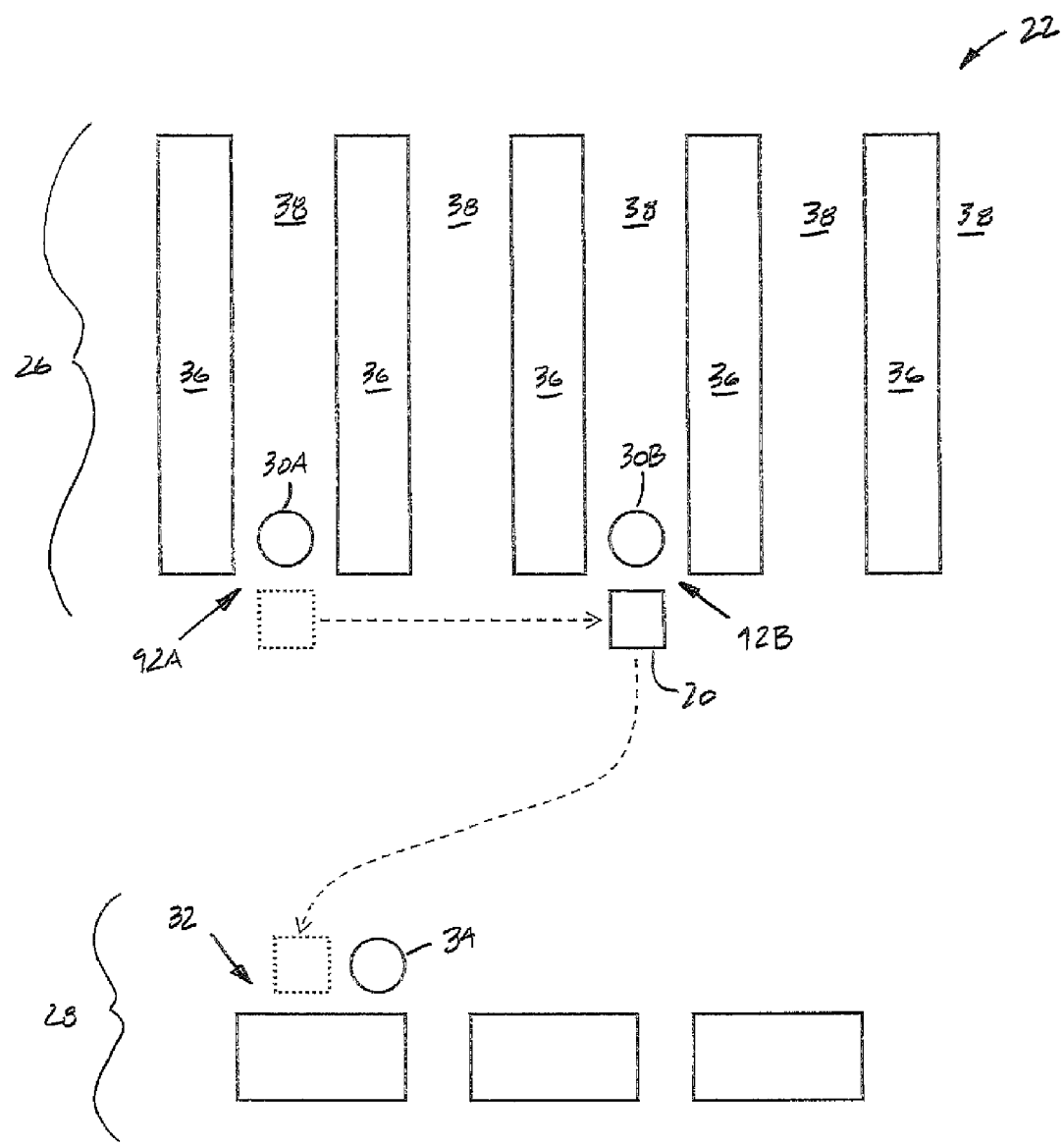
FIG. 11 is another block diagram of a mobile robot operating within the operating environment.

In some embodiments, the mobile robot 20 may travel to a plurality of pickup locations 92A-B to be loaded by a plurality of different individuals 30A-B as illustrated in FIG. 11. Each of the individuals 30A and 30B, for example, may be stationed at a respective pickup location 92A and 92B. The mobile robot 20 may subsequently deliver the items 24 to the drop off location 32.

Figure 12:
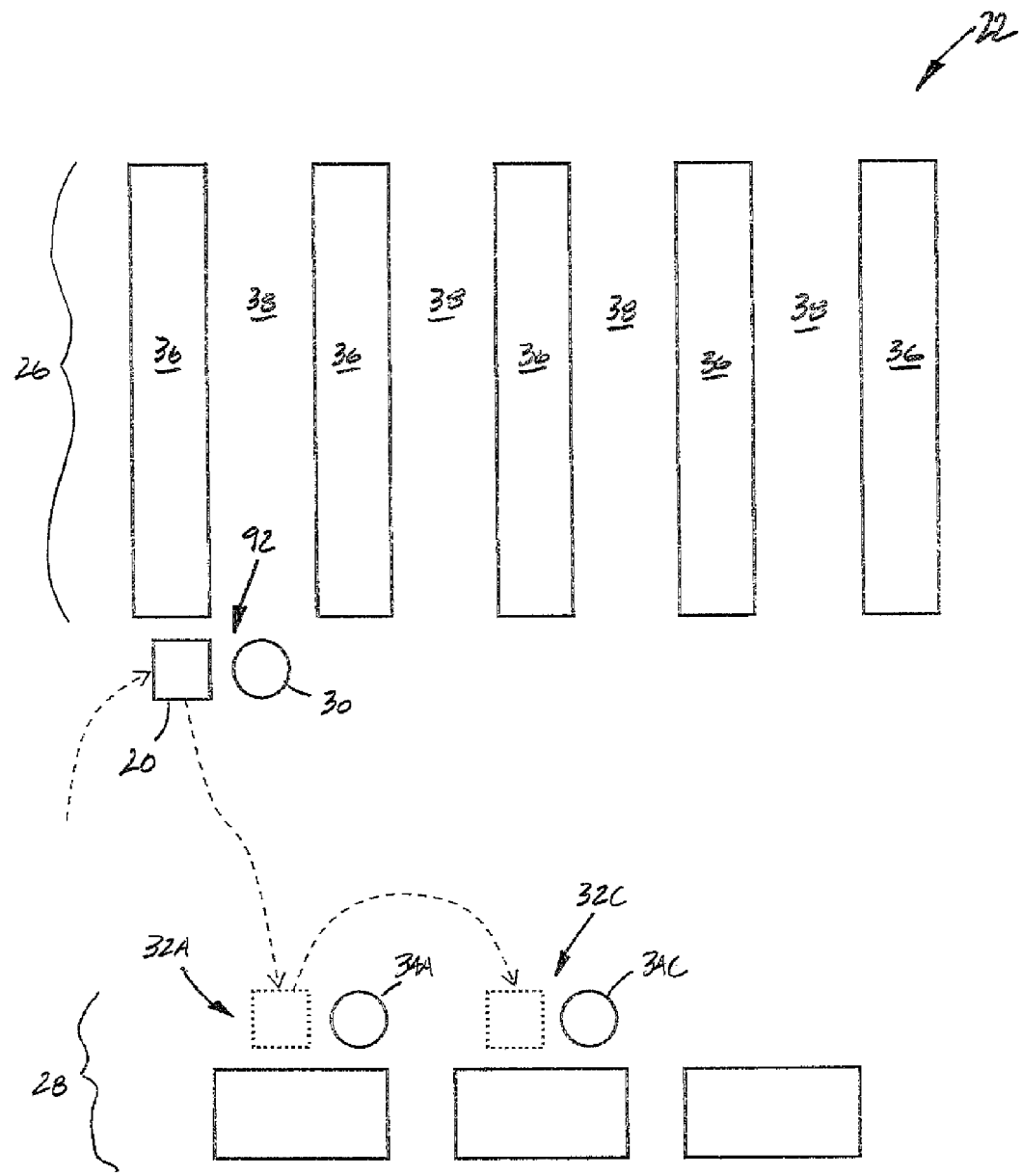
FIG. 12 is another block diagram of a mobile robot operating within the operating environment.

In some embodiments, the mobile robot 20 may deliver the items 24 to a plurality of drop off locations 32A and 32C as illustrated in FIG. 12. Items 24 associated with a first order, for example, may be delivered to the drop off locations 32A. Items 24 associated with a second order may be delivered to the drop off location 32c, etc.

In some embodiments, the mobile robot 20 may provide and/or limit access to one or more of the items 24 and/or one or more of the item supports 40. The controller 52, for example, may signal the manipulator system 50 to open one or more of the drawers 58 at one or more of the pickup locations 92 and/or drop off locations 32. The controller 52 may signal the manipulator system 50 to shut and hold one or more of the drawers 58 closed during transit and/or at certain locations where, for example, the items are to be securely transported.

In some embodiments, the mobile robot 20 may autonomously unload one or more of the items 24 using the manipulator system 50. The manipulator system 50, for example, may include one or more manipulator arms that can grasp and move the items 24.

In some embodiments, the individual 30 may utilize the user interface 44 to confirm the requested items 24 have been loaded with the mobile robot 20. The individual 30, for example, may scan a barcode on each item 24 as it is loaded with the mobile robot 20. The individual 30 may alternatively press a key on a touch screen of the tactile input device 68 to indicate a respective item 24 was loaded with the mobile robot 20.

In some embodiments, the mobile robot 20 may use, manipulate and/or otherwise control one or more devices within the operating environment 22 during and/or between performance of its task(s). The operating environment 22, for example, may include a transportation device such as an elevator, an escalator or a moving walk. The mobile robot 20 may ride the transportation device to move between various areas (e.g., floors) within the operating environment 22. The operating environment 22 may include at least one door which the mobile robots may autonomously open and/or close. The mobile robot 20, for example, may signal an actuator connected to the door to open and/or close the door. The operating environment 22, of course, may also or alternatively include one or more devices other than those described above, which may be used, manipulated and/or otherwise controlled by the mobile robot 20 during and/or between performance of its task(s).

In some embodiments, the mobile robot 20 may also perform one or more maintenance tasks. An example of a maintenance task is autonomously moving to and/or autonomously docking at an energy station. At the energy station, depleted energy storage device(s) (e.g., batteries, a fuel tank, a fuel cell, etc.) that store energy for powering one or more components of the mobile robot 20 may be charged, replaced and/or filled. Another example of a maintenance task is autonomously scheduling maintenance and/or autonomously moving to a maintenance location (e.g., a service bay) to receive one or more maintenance services from a technician(s). Examples of other tasks the mobile robot 20 may perform are disclosed in U.S. Pat. No. 7,902,784, U.S. Pat. No. 7,719,222, U.S. Pat. No. 7,348,747, U.S. patent application Ser. No. 13/587,098, U.S. patent application Ser. No. 13/678,193, and U.S. patent application Ser. No. 13/951,237, each of which is hereby incorporated herein in its entirety.

Figure 13:
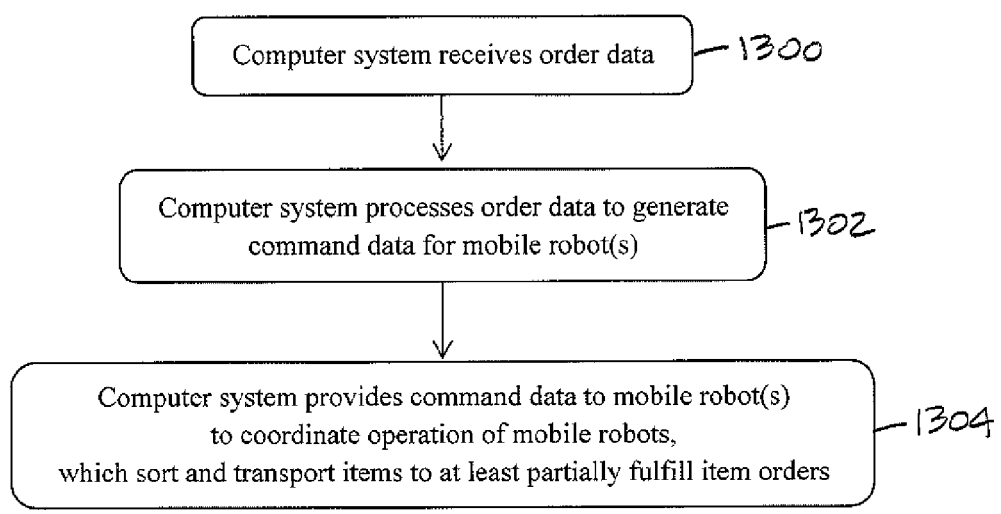
FIG. 13 is a flow diagram of a method involving a remote computer system coordinating operation of a plurality of mobile robots within the operating environment.

FIG. 13 is a flow diagram of a method involving the computer system 74 and a plurality of the mobile robots 20. This method is described below with reference to the mobile robots 20 of FIGS. 1-3 for illustrative purposes. The present method, however, may also be performed using mobile robots with configurations other than that described above and illustrated in the drawings. In addition, one or more of the following steps may be omitted or replaced with one or more additional steps depending upon the operating environment and the specific task to be performed.

In step 1300, the computer system 74 receives order data indicative of one or more item orders. The order data may be received from another computer system, which directly or indirectly receives item orders from customers for example. The order data may also or alternatively be received from the customers. The order data may also or alternatively be entered into the computer system 74 by one or more individuals. The order data may include information identifying:
   one or more items 24 for which the order was placed;
   cost of the item(s) 24 included in the order;
   delivery instructions for the order;
   where the order is to be delivered;
   when the order is to be delivered;
   when the order was placed; and/or
   who placed the order.
The order data, of course, may also or alternatively provide other information than that described above.

In step 1302, the computer system 74 processes the order data to generate the command data for one or more of the mobile robots. The command data may be generated based on some or all of the following information:
   where one or more of the mobile robots 20 is located;
   whether one or more of the mobile robots 20 is scheduled for maintenance;
   whether one or more of the mobile robots 20 is configured to receive the type of items 24 included in the order(s); and/or
   what other tasks one or more of the mobile robots 20 is scheduled to perform.
The command data, of course, may also or alternatively be generated based on other information than that described above.

The computer system 74 may use the foregoing information to determine which mobile robots 20 can be scheduled to fulfill some or all of the item order(s) in an expedient fashion. For example, the computer system 74 may (i) schedule the mobile robot 20A to receive items 24 (e.g., a first type of item) that are close in time or proximity to its present location and (ii) schedule the mobile robot 20B to receive items 24 (e.g., a second type of item) that are close in time or proximity to its present location. In this manner, each of the mobile robots 20A and 20B may fulfill a portion of the same order. In another example, the computer system 74 may schedule each mobile robot 20A and 20B to receive items 24 associated with a different order. In still another example, the computer system 74 may (i) schedule a mobile robot 20A that is currently performing another task to fulfill order(s) with low priority and (ii) schedule a mobile robot 20C that is not performing another task to fulfill order(s) with high priority. The priority of an order may be determined based on, for example, when the order was placed, the cost of the items 24 in the order, the status of the customer who placed the order, etc. The present invention, of course, is not limited to the foregoing examples.

In step 1304, the computer system 74 provides the command data to the mobile robots 20 to coordinate operation of the mobile robots 20. In this manner, the computer system 74 can utilize the mobile robots 20 to sort and transport the items 24 associated with one or more item orders. The mobile robots 20, for example, are instructed to receive designated items 24 and deliver those items 24 to designated drop off locations 32 at certain times and/or time frames. Each of the mobile robots 20 may receive and deliver one or more respective items 24 utilizing the method described above with respect to FIG. 8. Of course, one or more of the mobile robots 20 may receive and deliver the item(s) 24 utilizing variants to the method described above.

In some embodiments, the computer system 74 may schedule one of the mobile robots to take over another mobile robot's scheduled task(s) where that mobile robot is down for expected or unexpected maintenance. In this manner, the computer system 74 and reduce downtime.

In some embodiments, the computer system 74 may assign additional mobile robots 20 to sort and/or transport items 24 where the priority of an order is increased. Similarly, the computer system 74 may reassign some of the mobile robots 20 to perform other tasks where the priority of an order is decreased.

In some embodiments, the functionality of the computer system 74 may be performed by the controller 52 of one or more of the mobile robots 20. In this manner, the mobile robots 20 may coordinate their own operation.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

Although the description above contains many specific examples, these should not be construed as limiting the scope of the embodiments of the present disclosure, but as merely providing illustrations of some of the presently preferred embodiments of the present invention. It will be appreciated by those skilled in the art that changes could be made to the embodiments described above without departing from the broad inventive concept thereof. It is to be understood therefore that this disclosure is not limited to the specific embodiments disclosed herein, but it is intended to cover modifications within the spirit and scope of the embodiments of the present disclosure. Accordingly, the present invention is not to be restricted except in light of the attached claims and their equivalents.

What is claimed is:

1. A method involving a mobile robot at a fulfillment center, the method comprising;
   operating the mobile robot to lead an individual to a first location, within the fulfillment center, that is proximate to where an item is stored, wherein the operating comprises autonomously moving the mobile robot to the first location;
   marking the item visually using a marking device of the mobile robot;
   receiving the item with the mobile robot from the individual; and
   autonomously delivering the item using the mobile robot to a second location, within the fulfillment center, for further processing;
   wherein the mobile robot and the individual move along the same path as the mobile robot leads the individual to the first location, and the mobile robot autonomously moves in front of the individual as the mobile robot leads the individual to the first location.

2. The method as defined in claim 1, wherein the marking device is operably positioned on a manipulator arm of the mobile robot to enable the marking device to mark an item that may not be in the line of sight of the mobile robot.

3. A method of operating a mobile robot at a facility, comprising:
- providing a mobile robot capable of full autonomous operation with the facility without the need for guides or markers positioned in the facility;
- moving the mobile robot to a first location within the facility proximate to where an item is stored so that an individual can locate the item and load the item onto a portion of the mobile robot;
- providing an image of the item to be loaded on a display device of the mobile robot, the image including both the item to be loaded as well as the position of the item with respect to the surrounding of the item so that an individual can readily ascertain the exact location of the item;
- locating the item by the individual in the surrounding of the item;
- picking the item and transporting the item by the individual to a desired position on the mobile robot; and
- autonomously delivering the item via the mobile robot to a second location within the facility for further processing.

4. The method as defined in claim 3, including transporting the item by the individual to a manipulator arm of the mobile robot that receives the item from the individual and places the item on the proper position on the mobile robot.

* * * * *